US009337767B2

(12) United States Patent
Fahimi et al.

(10) Patent No.: US 9,337,767 B2
(45) Date of Patent: May 10, 2016

(54) SINGLE BUS STAR CONNECTED RELUCTANCE DRIVE AND METHOD

(71) Applicant: The Board of Regents, The University of Texas System, Austin, TX (US)

(72) Inventors: Babak Fahimi, Arlington, TX (US); Pourya Shamsi, Rolla, MO (US)

(73) Assignee: THE BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 5 days.

(21) Appl. No.: 14/318,170

(22) Filed: Jun. 27, 2014

(65) Prior Publication Data

US 2015/0002055 A1 Jan. 1, 2015

Related U.S. Application Data

(60) Provisional application No. 61/840,957, filed on Jun. 28, 2013.

(51) Int. Cl.
*H02P 1/46* (2006.01)
*H02P 25/08* (2016.01)

(52) U.S. Cl.
CPC .................................... *H02P 25/085* (2013.01)

(58) Field of Classification Search
CPC ................ H02P 1/46; H02P 3/18; H02P 6/00
USPC ............. 318/400.01, 400.02, 400.06, 400.07, 318/400.12, 400.14, 400.15, 701, 721, 799, 318/801, 432, 599, 811, 685, 400.13, 700, 318/430; 388/800, 806, 823, 854
See application file for complete search history.

(56) References Cited

U.S. PATENT DOCUMENTS

| | | | | |
|---|---|---|---|---|
| 4,961,038 | A * | 10/1990 | MacMinn | H02P 25/088 318/685 |
| 5,166,591 | A * | 11/1992 | Stephens | H02P 25/088 318/701 |
| 5,530,333 | A * | 6/1996 | Turner | H02P 25/08 318/400.13 |
| 5,754,024 | A * | 5/1998 | Sugiyama | 318/701 |
| 6,002,222 | A * | 12/1999 | Turner | 318/254.1 |
| 6,366,048 | B2 * | 4/2002 | Greif | 318/701 |
| 6,661,206 | B2 * | 12/2003 | Gallegos-Lopez | H02P 9/40 322/10 |

OTHER PUBLICATIONS

Texas Instruments Incorporated, "Digital Signal Processing Solutions for the Switched Reluctance Motor," Literature No. BPRA058, Jul. 1997, Texas Instruments Europe.

* cited by examiner

*Primary Examiner* — Antony M Paul
(74) *Attorney, Agent, or Firm* — Schultz & Associates, P.C.

(57) ABSTRACT

A system and methods for operating a switched reluctance machine includes a controller, an inverter connected to the controller and to the switched reluctance machine, a hysteresis control connected to the controller and to the inverter, a set of sensors connected to the switched reluctance machine and to the controller, the switched reluctance machine further including a set of phases the controller further comprising a processor and a memory connected to the processor, wherein the processor programmed to execute a control process and a generation process.

20 Claims, 11 Drawing Sheets

SINGLE BUS STAR CONNECTED RELUCTANCE DRIVE AND METHOD

CROSS REFERENCE TO RELATED APPLICATION

This application claims the benefit of priority to U.S. Provisional Application No. 61/840,957 filed Jun. 28, 2013. The above identified patent application is incorporated herein by reference in its entirety to provide continuity of disclosure.

GOVERNMENT LICENSE RIGHTS

This invention was made with government support under grant no. DE-AR0000210 awarded by the U.S. Department of Energy. The government has certain rights in the invention.

FIELD OF THE INVENTION

The present invention relates to switched reluctance and variable reluctance machines. In particular, the present invention relates to a control method and drive system for switched reluctance and variable reluctance machines.

BACKGROUND OF THE INVENTION

Transportation systems are an integral part of an industrial society. By providing mobility, transportation systems enable the trading of goods and convenience for users. These systems require energy to operate. The increase in population has resulted in more energy consumption by transportation systems. The cause for a cleaner environment and conservation of energy sources has led to the integration of more electric vehicles in the transportation systems. This has been accomplished by introducing hybrid electric vehicles and electric vehicles.

Currently, the majority of the hybrid electric vehicles utilize permanent magnet motor drives for propulsion because these drives have high torque densities resulting from the field created by the permanent magnets. However, the increasing demand for rare earth materials used in the manufacture of high energy magnets leads to a shortage of these elements and increased costs. Therefore, there is a demand for new types of motors with limited or no use of permanent magnets for automotive applications.

Switched reluctance machines have high torque densities, which can provide a solution for replacing permanent magnet machines. However, drives of the prior art for switched reluctance machines having n number of phases have a high number of semiconductor switches which will increase the cost of the converter dramatically. Further, the drives of the prior art require a high number of cable connections to the switched reluctance machines, which is a drawback for automotive applications of switched reluctance machines.

Referring to FIG. 1A for example, asymmetric bridge 101 of the prior art is shown. This topology requires 2×n switches and 2×n diodes for an n-phase switched reluctance machine. In order to increase efficiency, soft-switching inverters have been utilized in high speed applications where the switching frequency of the inverter is high. In conventional applications, for a switched reluctance machine having n phases, 2×n lead wires are required. In automotive industries, especially in powerful traction applications, the number of wires is an important factor because of the increased cost of manufacturing and maintenance per added wire. Therefore, the use of asymmetric bridges in automotive applications increases the costs of manufacturing.

Referring to FIG. 1B in another example, C-dump inverter 102 of the prior art is shown. Star connection 103 connects to buck converter 104 to provide a secondary voltage source for the operation of the drive. Dump capacitor 105 is the input capacitor for buck converter 104. Dump capacitor 105 is used for dumping the magnetizing energy of each phase at the end of the corresponding conduction cycle. C-dump inverter 102 requires n+1 switches and n+1 diodes for a switched reluctance machine having n phases. However, C-dump inverter 102 requires dump capacitor 105 or a variable voltage structure to maintain operational conditions. Further, dump capacitor 105 is bulky and requires cooling for operating at high temperatures. Therefore, the use of C-dump inverter 102 in automotive applications is costly and an inefficient use of space.

Therefore, there is a need in the prior art for a low cost drive and control method for switched reluctance machines with n number of phases that reduces the number of cable connections to the switched reluctance machines and prioritizes different phases in applying a reference current in the phases, thereby allowing for safe multi-phase operation of the drive of the switched reluctance machine.

SUMMARY

In one embodiment, a method for controlling a switched reluctance machine is provided. The method includes the steps of determining a conduction band for an electrical phase angle for each phase of a set of phases, enforcing a reference current in each phase of the set of phases, determining a preemptive band for the electrical phase angle for each phase of the set of phases, increasing the reference current to a preemptive reference current in each phase of the set of phases, and discharging the reference current from each phase of the set of phases.

In another embodiment, a method for controlling a switched reluctance machine is provided. In this embodiment, the method includes the steps of determining a conduction band for an electrical phase angle for each phase of a set of phases, increasing a first current in each phase of the set of phases, determining a reference current for the first current in each phase of the set of phases, enforcing the reference current on each phase of the set of phases, determining a preemptive band for the electrical phase angle for each phase of the set of phases, reducing the reference current to a preemptive current in each phase of the set of phases, and discharging the reference current from each phase of the set of phases.

In another embodiment, a system for operating a switched reluctance machine is provided. The system includes a controller, an inverter connected to the controller and to the switched reluctance machine, a hysteresis control connected to the controller and to the inverter, a set of sensors connected to the switched reluctance machine and to the controller, the switched reluctance machine further including a set of phases, the controller further including a processor and a memory connected to the processor, wherein the processor programmed to execute a control process and a generation process.

BRIEF DESCRIPTION OF THE DRAWINGS

The disclosed embodiments will be described with reference to the accompanying drawings. Like pieces in different drawings are designated by the same number.

DETAILED DESCRIPTION

Figure 1A:
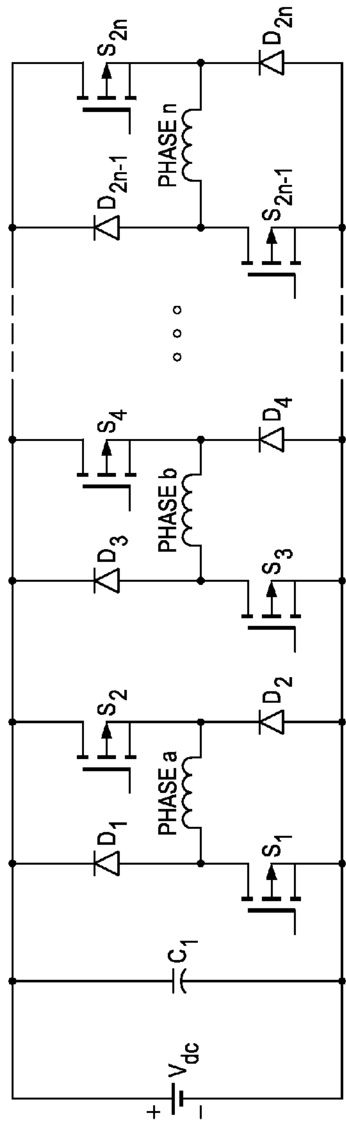
FIG. 1A is a schematic of an asymmetric bridge of the prior art.
Figure 1B:
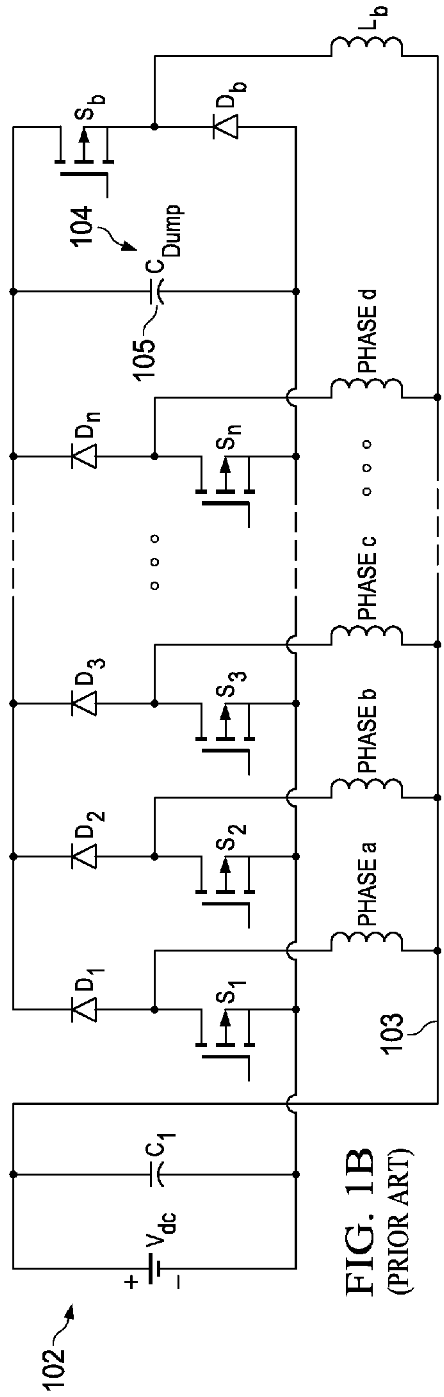
FIG. 1B is a schematic of a C-dump inverter of the prior art.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 2A:
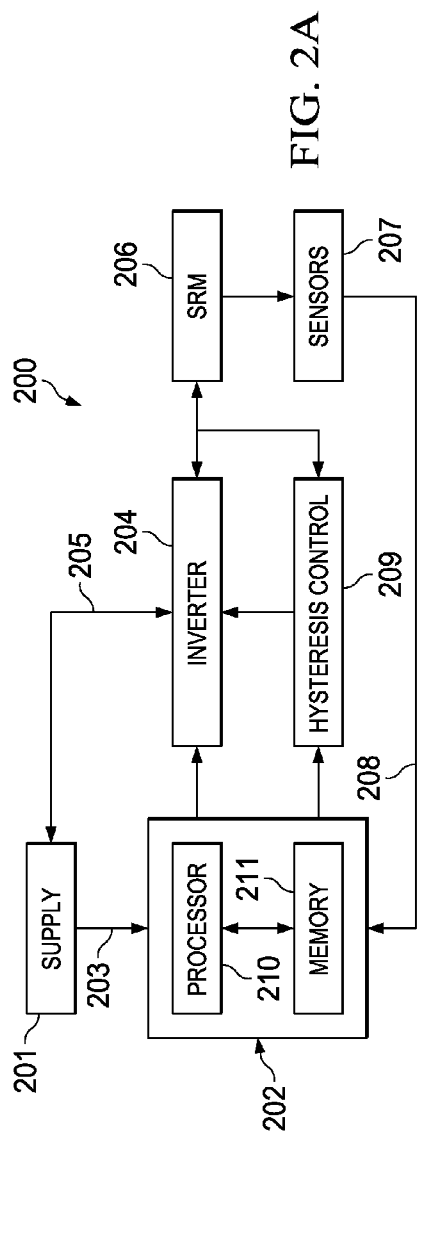
FIG. 2A is a block diagram of a preferred embodiment.

Referring to FIG. 2A, supply 201 of system 200 is connected to inverter 204 with main supply line 205 and to controller 202 with auxiliary line 203. Controller 202 is connected to inverter 204 and to hysteresis control 209. Inverter 204 is connected to switched reluctance machine 206 and to hysteresis control 209. Switched reluctance machine 206 is connected to sensors 207. Sensors 207 are connected to controller 202 with feedback line 208. Controller 202 has processor 210 connected to memory 211. Control processes are stored in memory 211 and are executed by processor 210.

Controller 202 is configured with a first set of program instructions which are executed when controller 202 is powered on. The first set of program instructions are a set of machine code instructions that receives and examines data of switched reluctance machine 206 from sensors 207 through feedback line 208, compares the data to pre-determined rules, and switches power on and off to n phases of switched reluctance machine 206 based on the comparisons to operate switched reluctance machine 206.

In use, controller 202 sends a signal to inverter 204 to activate each phase of switched reluctance machine 206 and a reference current to hysteresis control 209 for each phase. Inverter 204 supplies a current for switched reluctance machine 206 in a motoring mode and receives a current from switched reluctance machine 206 in a generating mode. The motoring mode and the generating mode are further discussed below. Hysteresis control 209 receives the reference current, the actual current for each phase of switched reluctance machine 206, and the phase which is energized by inverter 204. Hysteresis control 209 sends gate signals to inverter 204 to energize a given phase of switched reluctance machine 206. Sensors 207 detect a rotor position, phase voltage, and phase currents from switched reluctance machine 206.

In a preferred embodiment, switched reluctance machine 206 has n phases, a rotor, and at least one stator. In another embodiment, switched reluctance machine 206 is a variable reluctance machine having n phases. Other switched reluctance machines known in the art may be employed.

In one embodiment, switched reluctance machine 206 operates in a motoring mode generating torque. In another embodiment, switched reluctance machine 206 operates in a generation mode, generating a current back to supply 201.

In a preferred embodiment, sensors 207 are a set of rotor position, voltage, inductance, and current sensors. Any suitable position, voltage, inductance, or current sensor known in the art may be employed. In one embodiment, rotor position is detected directly through a mounted rotor position sensor. In another embodiment, rotor position is calculated using the measured voltage and measured current using a function with a 1:1 correspondence with rotor position.

In one embodiment, sensors 207 connect to controller 202 through feedback line 208.

In another embodiment, sensors 207 connect to controller 202 wirelessly via a Wi-Fi network, a cellular network, a Bluetooth connection, or a ZigBee wireless communication system. Other wireless communications means known in the art may be employed.

In a preferred embodiment, hysteresis control 209 is a current loop. Other suitable current hysteresis controllers known in the art may be employed.

Figure 2B:
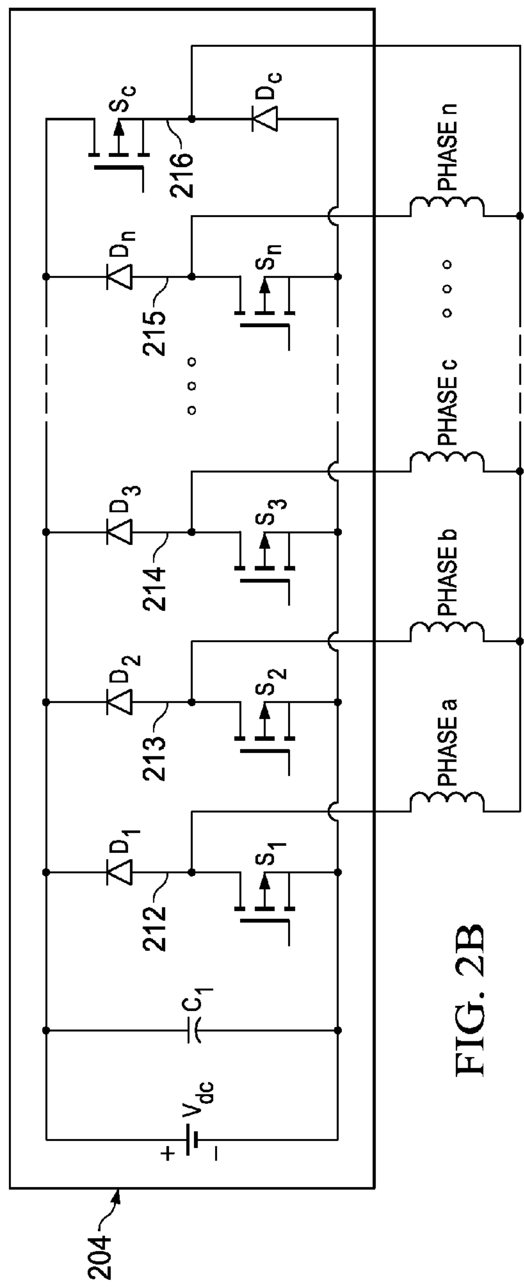
FIG. 2B is a schematic of an inverter of a preferred embodiment.

Referring to FIG. 2B, inverter 204 is shown. Inverter 204 is a neutral connected asymmetric bridge, a Miller converter. Each of n phases of switched reluctance machine 206 is connected to an asymmetric leg of inverter 204 capable of sinking current and star connected to an asymmetric leg of inverter 204 capable sourcing current. Phase a is connected to leg 212 and leg 216. Phase b is connected to leg 213 and leg 216. Phase c is connected to leg 214 and leg 216. Phase n is connected to leg 215 and 216. Leg 216 has switch $S_c$, and diode $D_c$. For a given phase i, leg i has switch $S_i$ and diode $D_i$.

In use, current is increased for a given phase i of n phases of switched reluctance machine 206 by turning on switch $S_c$ and switch $S_i$ of phase i. A positive $v_{dc}$ is applied to phase i.

Figure 2C:
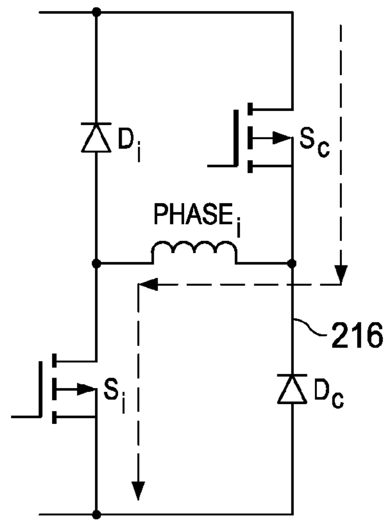
FIG. 2C is a schematic of an inverter in a hard chopping mode of a preferred embodiment.
Figure 2D:
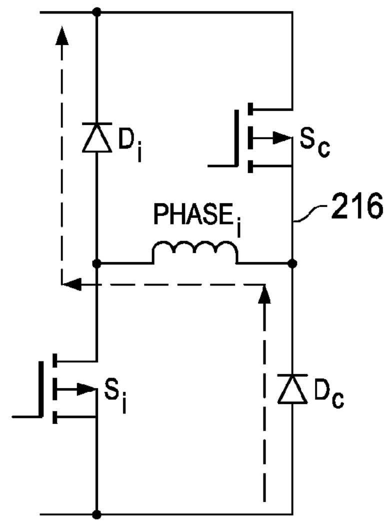
FIG. 2D is a schematic of an inverter in a hard chopping mode of a preferred embodiment.

Hard chopping modes for a given phase i is achieved through switches $S_c$ and $S_i$ or diodes $D_c$ and $D_i$ pairs. Referring to FIG. 2C, switches $S_c$ and $S_i$ are turned on to achieve hard chopping on phase i. Referring to FIG. 2D, diodes $D_c$ and $D_i$ are turned on to achieve hard chopping on phase i.

Figure 2E:
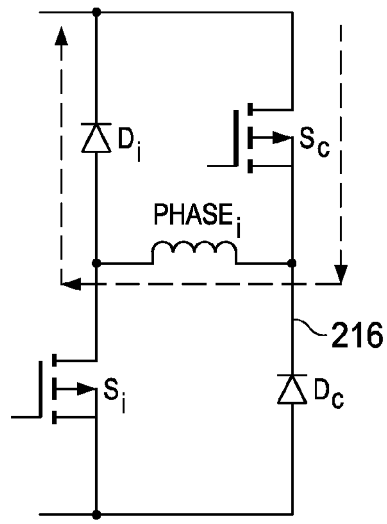
FIG. 2E is a schematic of an inverter in a soft chopping mode of a preferred embodiment.
Figure 2F:
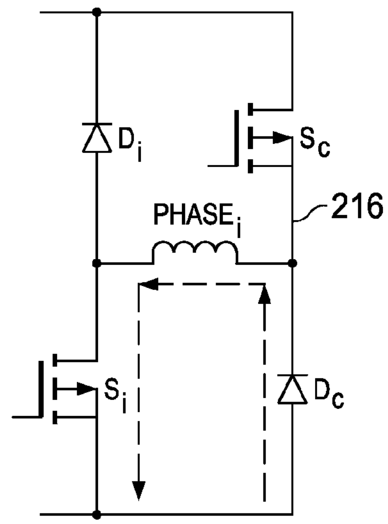
FIG. 2F is a schematic of an inverter in a soft chopping mode of a preferred embodiment.

Referring to FIG. 2E, a soft chopping mode for a given phase i is achieved by turning on switch $S_c$ and diode $D_i$. Referring to FIG. 2F, a soft chopping mode for a given phase i is achieved by turning on switch $S_i$ and diode $D_c$.

In one embodiment, current is decreased on phase i using soft chopping by applying zero voltage over phase i with back electromotive force (EMF) from switched reluctance machine 206. In this embodiment, switch $S_c$ is turned on and switch $S_i$ is turned off, thereby applying the zero voltage across phase i.

In another embodiment, current is decreased on phase i using hard chopping by applying a negative $v_{dc}$ across phase i. Switches $S_c$ and $S_i$ are turned off. The current on phase i forces diodes $D_c$ and $D_i$ to turn on, thereby discharging current on phase i.

Figure 3:
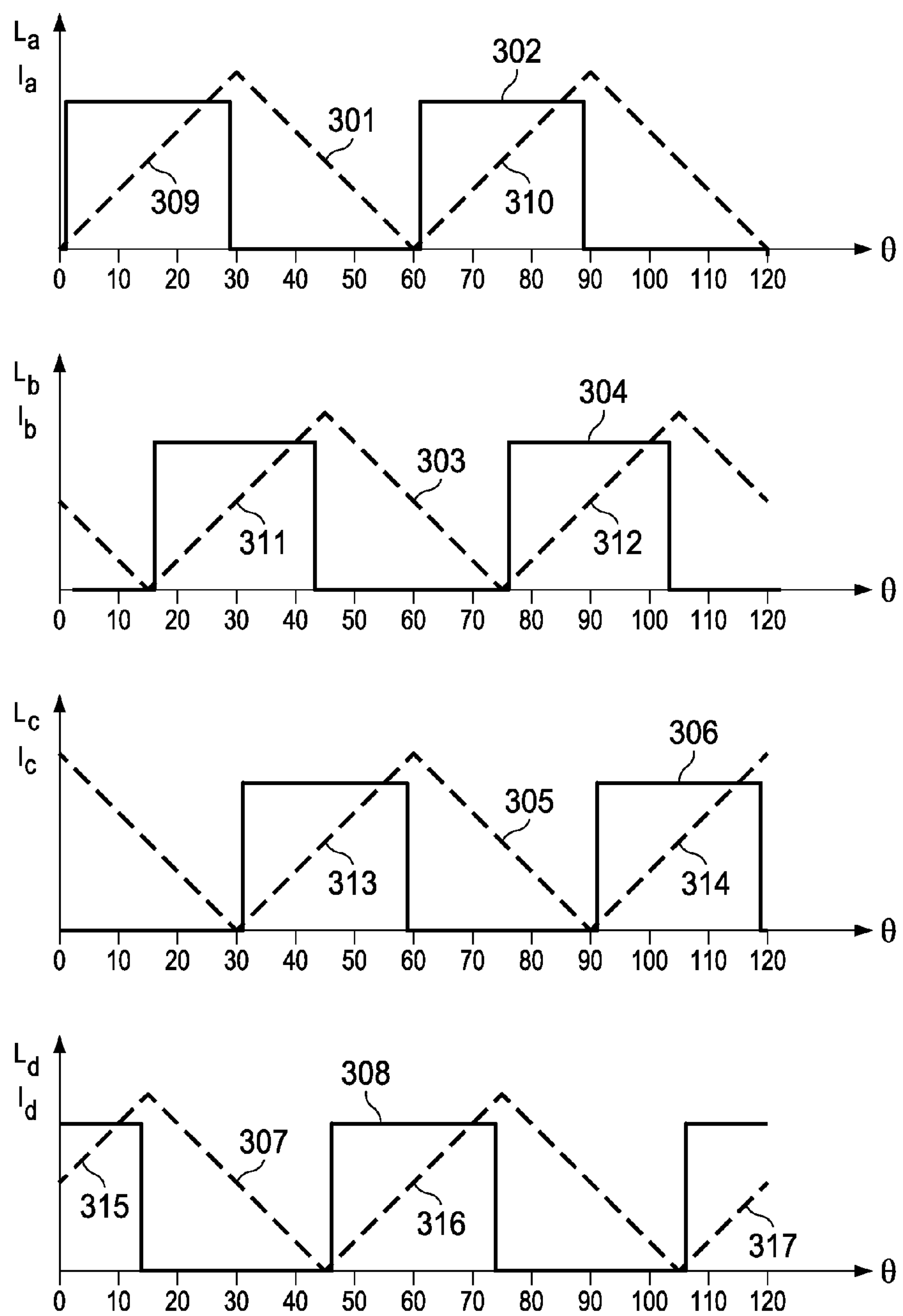
FIG. 3 is a graph of an inductance profile and a corresponding drive current for a multi-phase switched reluctance machine of a preferred embodiment.

Referring to FIG. 3 by way of example, an inductance profile and the corresponding drive current for switched reluctance machine 206 having phases a, b, c, and d is shown. θ is the electrical phase angle of the rotor of switched reluctance machine 206. Curve 301 is the inductance for phase a and curve 302 is the current for phase a. Curve 303 is the inductance for phase b and curve 304 is the current for phase b. Curve 305 is the inductance for phase c and curve 306 is the current for phase c. Curve 307 is the inductance for phase d and curve 308 is the current for phase d.

Current is applied to each phase during a conduction band of each phase. The conduction band in a motoring mode of operation for a phase is a range of electrical phase angles of the rotor of switched reluctance machine 206 where the inductance increases. Each phase has conduction bands approximately 60 degrees apart, thereby conducting approximately six times during a full rotation of the rotor of switched reluctance machine 206. The phase shift of the conduction bands between two adjacent phases is approximately 15 degrees. Positive slopes 309 and 310 of curve 301 are conduction bands of phase a. Positive slopes 311 and 312 of curve 303 are conduction bands for phase b. Positive slopes 313 and 314 of curve 305 are conduction bands for phase c. Positive slopes 315, 316, and 317 of curve 307 are conduction bands for phase d. The conduction bands of phases a, b, c, and d overlap. An overlap of approximately 15 degrees is observed between conduction bands of adjacent phases.

Each phase has a preemptive band, a range of the electrical phase angles of the rotor of switched reluctance machine 206 wherein the current in the previous phase, i−1, is turning off and the current in phase i is turned on.

Figure 4A:
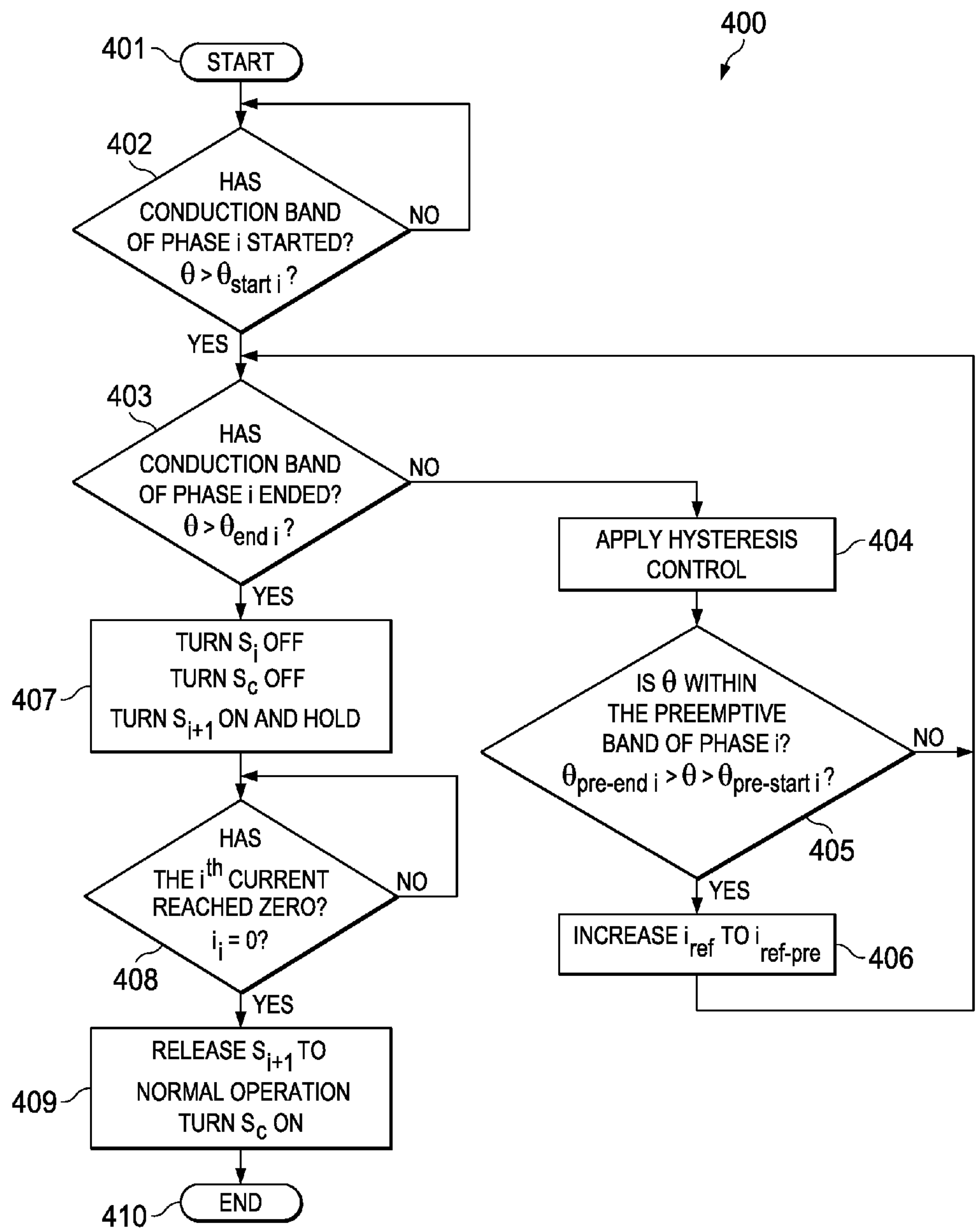
FIG. 4A is a flowchart of a method for controlling a drive of a switched reluctance machine of a preferred embodiment.

Referring to FIGS. 2B and 4A, motoring control process 400 is described for a given phase i of switched reluctance machine 206. Control process 400 is repeated for each of n phases of switched reluctance machine 206. In a preferred embodiment, processor 210 of controller 202 executes motoring control process 400 stored in memory 211. In this embodiment, motoring control process 400 controls switched reluctance machine 206 to generate a torque. Motoring control process 400 begins at step 401 as the rotor approaches the conduction band for phase i. In step 402, a starting angle of a conduction band of phase i is determined, i.e., whether the electrical phase angle of the rotor is greater than a predetermined starting electrical phase angle. If the electrical phase angle of the rotor is not greater than the predetermined starting electrical phase angle, then step 402 repeats. In step 403, an end of the conduction band of phase i is determined, i.e., whether the electrical phase angle of the rotor is greater than a predetermined ending electrical phase angle.

In step 404, hysteresis control 209 enforces a predetermined reference current on phase i by turning on switches $S_i$ and $S_c$ within the conduction band. Current increases with hard chopping of switches $S_c$ and $S_i$. Current decreases with soft chopping of switch $S_c$ and diode $D_i$. In step 405, a preemptive band of the electrical phase angle of the rotor in phase i is determined, i.e., whether the electrical phase angle of the rotor is greater than a starting preemptive angle and less than an ending preemptive angle. Each phase has a preemptive band, a range of the electrical phase angles of the rotor of switched reluctance machine 206 wherein the current in the previous phase, i−1, is turning off and the current in phase i is turned on. If the electrical phase angle of the rotor is not within the predetermined preemptive band, then step 403 is repeated. In step 406, if the electrical phase angle of the rotor is within the preemptive band angle range, then the reference current is increased to the preemptive reference current. While switches $S_{i-1}$ and $S_c$ are turned off to discharge the current in phase i−1, switch $S_i$ remains turned on to prevent hard chopping in phase i.

Figure 4B:
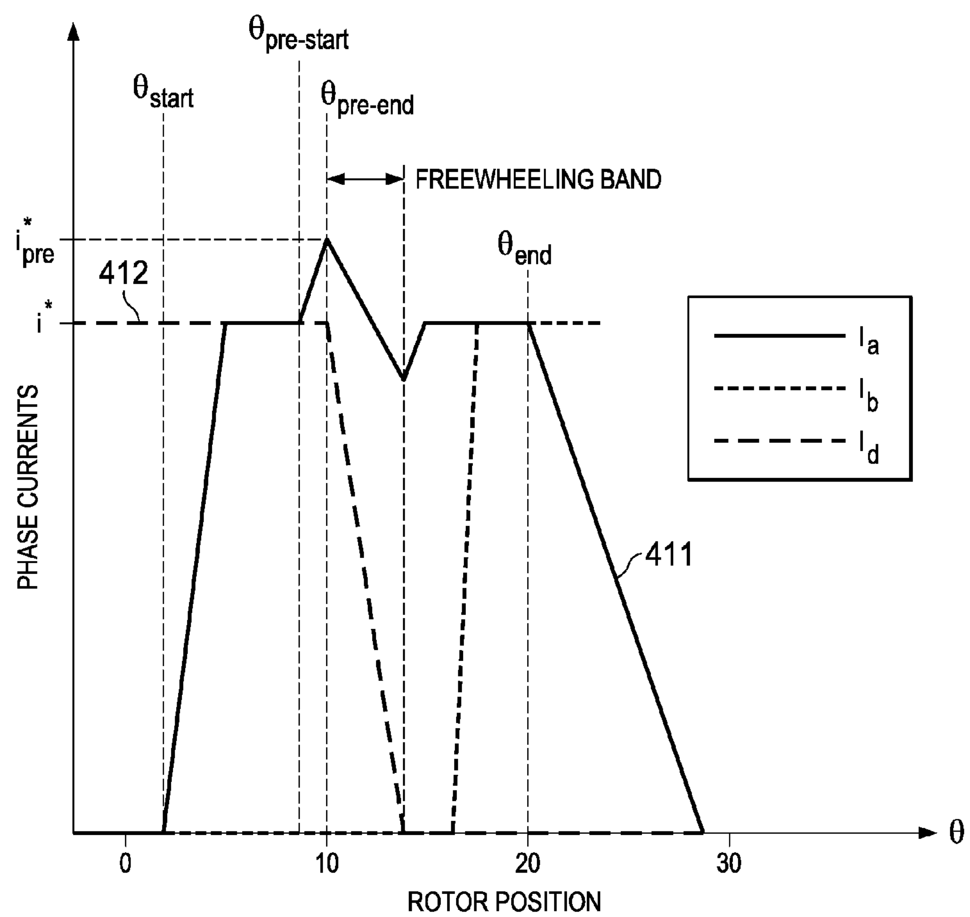
FIG. 4B is a graph of phase currents versus rotor position of a preferred embodiment.

Referring to FIG. 4B by way of example, while phase i−1 is turning off, phase i is still conducting. In this example, curve 411 is the current in phase i and curve 412 is the current in phase i−1. Switches $S_{i-1}$ and $S_c$ have to be turned off to discharge the current in phase i−1. In order to prevent hard chopping on phase i−1, switch $S_i$ remains turned on resulting in freewheeling of current for phase i through $D_c$, which can reduce the current below the reference current due the back EMF of switched reluctance machine 206. To compensate, the reference current in phase i is increased to the preemptive reference current. The current decreases to the reference current after the preemptive band angle range ends. During phase i, the average current remains unchanged.

Returning to FIG. 4A, in step 407, switches $S_i$ and $S_c$ are turned off when the electrical phase angle is greater than the ending angle of the conduction band for phase i. Switch $S_{i+1}$ is turned on to enforce soft chopping on phase 1+1. In step 408, switches $S_i$ and $S_c$ remain turned off until the reference current in phase i is approximately zero. In step 409, switches $S_{i+1}$ and $S_c$ are turned on to begin phase i+1. Motor control process 400 ends at step 410.

Figure 5:
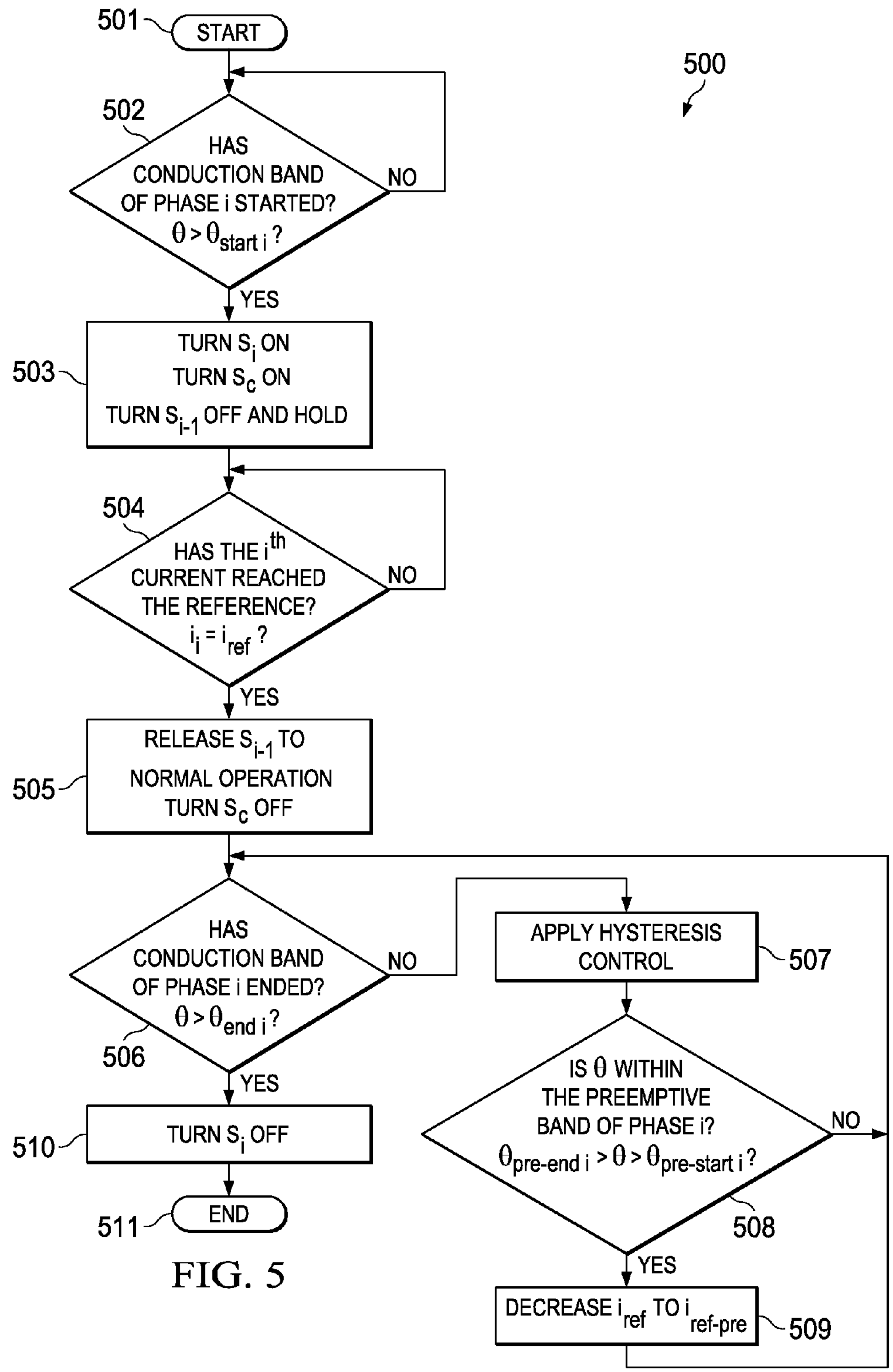
FIG. 5 is a flowchart of a method for controlling a drive of a switched reluctance machine of a preferred embodiment.

Referring to FIGS. 2B and 5 in another embodiment, generation process 500 is described for a given phase i of switched reluctance machine 206. Generation process 500 is repeated for each of n phases of switched reluctance machine 206. In a preferred embodiment, processor 210 of controller 202 executes generation process 500 stored in memory 211. In this embodiment, generation process 500 controls switched reluctance machine 206 to generate current. Generation process 500 begins at step 501. In step 502, a starting angle of a conduction band of phase i is determined, i.e., whether the electrical phase angle of the rotor is greater than a predetermined starting electrical phase angle. If the electrical phase angle of the rotor is not greater than the predetermined starting electrical phase angle, then step 502 repeats until the electrical phase angle of the rotor is greater than the predetermined starting electrical phase angle. In step 503, switches $S_i$ and $S_c$ are turned on and switch $S_{i-1}$ is turned off to enforce soft chopping on phase i−1. A first current in phase i increases. In step 504, whether the first current in phase i is approximately equal to a reference current is determined. Step 504 is repeated until the first current in phase i is approximately equal to the reference current. In step 505, switch $S_{i-1}$ is turned on and switch $S_c$ is turned off once the first current in phase i is approximately equal the reference current.

In step 506, a determination is made whether the conduction band of phase i has ended, i.e., whether the electrical phase angle is greater than a predetermined ending electrical phase angle. In step 507, hysteresis control 209 is applied within the conduction band of phase i to continue enforcing the reference current on phase i. Switch $S_c$ remains turned off and switch $S_i$ remains turned on. Current increases with the soft chopping of switch $S_i$ and diode $D_c$ using the back EMF of switched reluctance machine 206. In step 508, a preemptive band of the electrical phase angle of the rotor for generation in phase i is determined, i.e., whether the electrical phase angle of the rotor is greater than a starting preemptive angle and less than an ending preemptive angle. If the electrical phase angle of the rotor is not within the preemptive band, then steps 506, 507, and 508 are repeated until the electrical phase angle is within the preemptive band.

In step 509, the electrical phase angle is within the preemptive band and the reference current is reduced to the preemptive reference current for generation. The preemptive reference current is predetermined for the generation cycle. During the preemptive band, a second current is charging phase i+1 while phase i is conducting. Switches $S_{i+1}$ and $S_c$ are turned on to increase the second current of phase i+1. Switch $S_i$ remains turned on to prevent hard chopping on phase i resulting in soft chopping on phase i, which can increase the first current to greater than the reference current. To compensate, the reference current is reduced to the preemptive reference current.

Once the conduction band of phase i has ended in step 506, switch $S_i$ is turned off in step 510 to discharge the current of phase i using diodes $D_c$ and $D_i$ for hard chopping. Current is discharged from phase i back to the dc bus. Generation process 500 ends at step 511.

A model of switched reluctance machine 206 can be used to calculate the preemptive reference currents and to calculate the required time for controller 202 to charge and discharge the phase currents. The dynamic equations of switched reluctance machine 206 during multi-phase operation can be calculated using:

$$v_k = R_k i_k + \frac{dL_{kk}}{d\theta}\frac{d\theta}{dt}i_k + \frac{dL_{kk}}{di_k}\frac{di_k}{dt} + \frac{di_k}{dt}L_{kk} + \frac{dL_{kj}}{d\theta}\frac{d\theta}{dt}i_j + \frac{dL_{kj}}{di_j}\frac{di_j}{dt} + \frac{di_j}{dt}L_{kj} \quad \text{Eq. 1}$$

$$v_j = R_j i_j + \frac{dL_{jj}}{d\theta}\frac{d\theta}{dt}i_j + \frac{dL_{jj}}{di_j}\frac{di_j}{dt} + \frac{di_j}{dt}L_{jj} + \frac{dL_{jk}}{d\theta}\frac{d\theta}{dt}i_k + \frac{dL_{jk}}{di_k}\frac{di_k}{dt} + \frac{di_k}{dt}L_{jk} \quad \text{Eq. 2}$$

where $v_k$ and $i_k$ is the voltage and the phase current of phase k of inverter 204, respectively. $R_k$ is the resistance and $L_{kk}$ is the self-inductance for phase k. $L_{jj}$ is the self-inductance for phase j. Each of $L_{kj}$ and $L_{jk}$ is the mutual inductance between phases k and j with respect to each other. Inductances of switched reluctance machine 206 are functions of the rotor angle and the phase current, i.e., $L=L_{jk}(\theta, i_j, i_k)$. Phases k and j are two adjacent phases in a multi-phase mode of operation and phase j is excited before phase k. Phase j is turned off during the conduction band of phase k. If the rotation speed of the rotor is relatively slow compared to the switching period, the variations of the rotor angle can be neglected. If the nonlinear effects of the core due to the saturation of switched reluctance machine 206 are considered to be very small, then the variations of the inductance with respect to the variations of the current are negligible. Therefore, Eq. 1 can be simplified as:

$$v_k = R_k i_k + \frac{dL_{kk}}{d\theta}\omega i_k + \frac{dL_{kj}}{d\theta}\omega i_j + \frac{di_k}{dt}L_{kk} + \frac{di_j}{dt}L_{kj} \quad \text{Eq. 3}$$

$$v_j = R_j i_j + \frac{dL_{jj}}{d\theta}\omega i_j + \frac{dL_{jk}}{d\theta}\omega i_k + \frac{di_j}{dt}L_{jj} + \frac{di_k}{dt}L_{jk} \quad \text{Eq. 4}$$

These dynamic equations can form the state space model of the active phases as:

$$\dot{x} = Ax + Bu \quad \text{Eq. 5}$$

$$x = [\,i_k \quad i_j\,]^T \quad \text{Eq. 6}$$

$$A_{11} = \frac{-R_k L_{jj} - \omega(L'_{kk_\theta} L_{jj} - L'_{jk_\theta} L_{kj})}{L_{kk} L_{jj} - L_{jk} L_{kj}} \quad \text{Eq. 7}$$

$$A_{12} = \frac{R_j L_{kj} + \omega(L'_{jj_\theta} L_{kj} - L'_{kj_\theta} L_{jj})}{L_{kk} L_{jj} - L_{jk} L_{kj}} \quad \text{Eq. 8}$$

$$A_{21} = \frac{R_k L_{jk} + \omega(L'_{kk_\theta} L_{jk} - L'_{jk_\theta} L_{kk})}{L_{kk} L_{jj} - L_{jk} L_{kj}} \quad \text{Eq. 9}$$

$$A_{22} = \frac{-R_j L_{kk} - \omega(L'_{jj_\theta} L_{kk} - L'_{kj_\theta} L_{jk})}{L_{kk} L_{jj} - L_{jk} L_{kj}} \quad \text{Eq. 10}$$

$$Bu = \frac{1}{L_{kk} L_{jj} - L_{jk} L_{kj}} \begin{bmatrix} L_{jj} & -L_{kj} \\ -L_{jk} & L_{kk} \end{bmatrix} \begin{bmatrix} v_k \\ v_j \end{bmatrix} \quad \text{Eq. 11}$$

where $L'_{jk_\theta}$ is the derivative of the inductance with respect to the rotor angle, i.e., $$\frac{dL_{jk}}{d\theta}.$$

$\dot{i}_k$ is the derivative of the current with respect to time. During the discharge period, the applied voltage of inverter 204 to phase j is the negative of the de bus, i.e., $v_j = -v_{dc}$. During this period, phase k is under soft chopping, i.e., $v_k = 0$. The phase currents of switched reluctance machine 206 during the discharge of the current from phase j can be calculated as:

$$I_k(s) = \frac{1}{sF_1(s)}\Big\{i^*_{pre}(L_{kk}L_{jj} - L^2_{jk})s^2 + v_{dc}L'_{jk_\theta}\omega + \Big[\big(L'_{jj_\theta}\big(i^*_{pre}(L_{kk} + i^* L_{jk}) - L'_{jk_\theta}(i^*_{pre}L_{jk} + i^* L_{jj})\big)\omega + (i^*_{pre}L_{kk} + i^* L_{jk})R_j + L_{jk}v_{dc}\Big]s\Big\} \quad \text{Eq. 12}$$

$$I_j(s) = \frac{1}{sF_1(s)}\Big\{i^*(L_{kk}L_{jj} - L^2_{jk})s^2 - v_{dc}\big(L'_{kk_\theta}\omega + R_k\big) + \Big[\big(L'_{kk_\theta}\big(i^*_{pre}(L_{jk} + i^* L_{jj}) - L'_{jk_\theta}(i^*_{pre}L_{kk} + i^* L_{jk})\big)\omega + (i^*_{pre}L_{jk} + i^* L_{jj})R_k - L_{kk}v_{dc}\Big]s\Big\} \quad \text{Eq. 13}$$

where the characteristic function $F_1(s)$ can be calculated using:

$$F_1(S) = (L_{kk}L_{jj} - L_{jk}^2)s^2 + [(L'_{jj\theta}L_{kk} + LL'_{kk\theta}L_{jj} - 2L'_{jk\theta}L_{jk})\omega + L_{jj}R_k + L_{kk}R_j]s + (L'_{kk\theta}L'_{jj\theta} - (L'_{jk\theta})^2)\omega^2 + (L'_{jj\theta}R_k + L'_{kk\theta}R_j)\omega + R_jR_k \quad \text{Eq. 14}$$

For this transformation, the initial conditions of the variables are added to the Laplace transform. It can be assumed that the current of phase k has reached the preemptive reference current $i_{pre}$* and the current of phase j is the reference current i* prior to the discharge cycle.

Using these equations, the required time for discharging the current can be calculated. The required time for discharging the current corresponds to the minimum amount of turn-off angle required for discharging the current before the generation mode starts. The required preemptive reference current, $i_{pre}$*, to keep the average of the current unchanged in the soft chopping phase, phase k, can be calculated using Eq. 12. The mutual inductances as compared to the self-inductances are small values. Usually, Eq. 12 and Eq. 13 cannot be simplified further. However, if the mutual inductance between phases j and k is neglected, Eq. 12 and Eq. 13 can be simplified as:

$$I_k(s) = \frac{i^*_{pre}L_{kk}}{L_{kk}s + L'_{kk_\theta}\omega + R_k} \quad \text{Eq. 15}$$

$$I_j(s) = \frac{i^* L_{jj}s - v_{dc}}{s(L_{jj}s + L'_{jj_\theta}\omega + R_j)} \quad \text{Eq. 16}$$

and the currents during the required time for discharging can be calculated using $$i_k(t) = i^*_{pre}e^{-\frac{L'_{kk_\theta}\omega + R_k}{L_{kk}}t} \quad \text{Eq. 17}$$

$$i_j(t) = i^* e^{-\frac{L'_{jj_\theta}\omega + R_j}{L_{jj}}t} + \frac{-v_{dc}}{L'_{jj_\theta}\omega + R_j}\left(1 - e^{-\frac{L'_{jj_\theta}\omega + R_j}{L_{jj}}t}\right) \quad \text{Eq. 18}$$

The required amount of time to discharge the current and the required preemptive current can be calculated using $$t_{discharge} = \frac{-L_{jj}}{L'_{jj_\theta}\omega + R_j}\ln\left(\frac{v_{dc}}{v_{dc} + i^*(L'_{jj_\theta}\omega + R_j)}\right) \quad \text{Eq. 19}$$

$$i^*_{pre} = \frac{2i^*}{1 + e^{-\frac{L'_{kk_\theta}\omega + R_k}{L_{kk}}t_{discharge}}} \quad \text{Eq. 20}$$

During the discharge period of phase j, the preemptive reference current can keep the average of the current of phase k constant. The required model to calculate the preemptive reference currents is derived. The model can be used to calculate the required time necessary for controller 202 to charge and discharge the phase currents.

Tests

Several tests were conducted to test the efficacy of motoring control process 400 and generation process 500. In the tests, a 4 kilowatt water-cooled inverter 204 was designed and developed. The test setup utilized two switches in leg 216 because of the higher requirements for the current ratings of leg 216. During the multi-phase excitation modes of operation, the current consumed by the star connected leg is twice the phase currents of switched reluctance machine 206 because of the simultaneous operation of two phases of switched reluctance machine 206. A high power switch was required for the star connected leg of inverter 204.

Test 1

In Test 1, motoring control process 400 was tested. Switched reluctance machine 206 was operating on a multi-phase excitation. A reference current of 2.5 A was applied to switched reluctance machine 206.

Figure 6:
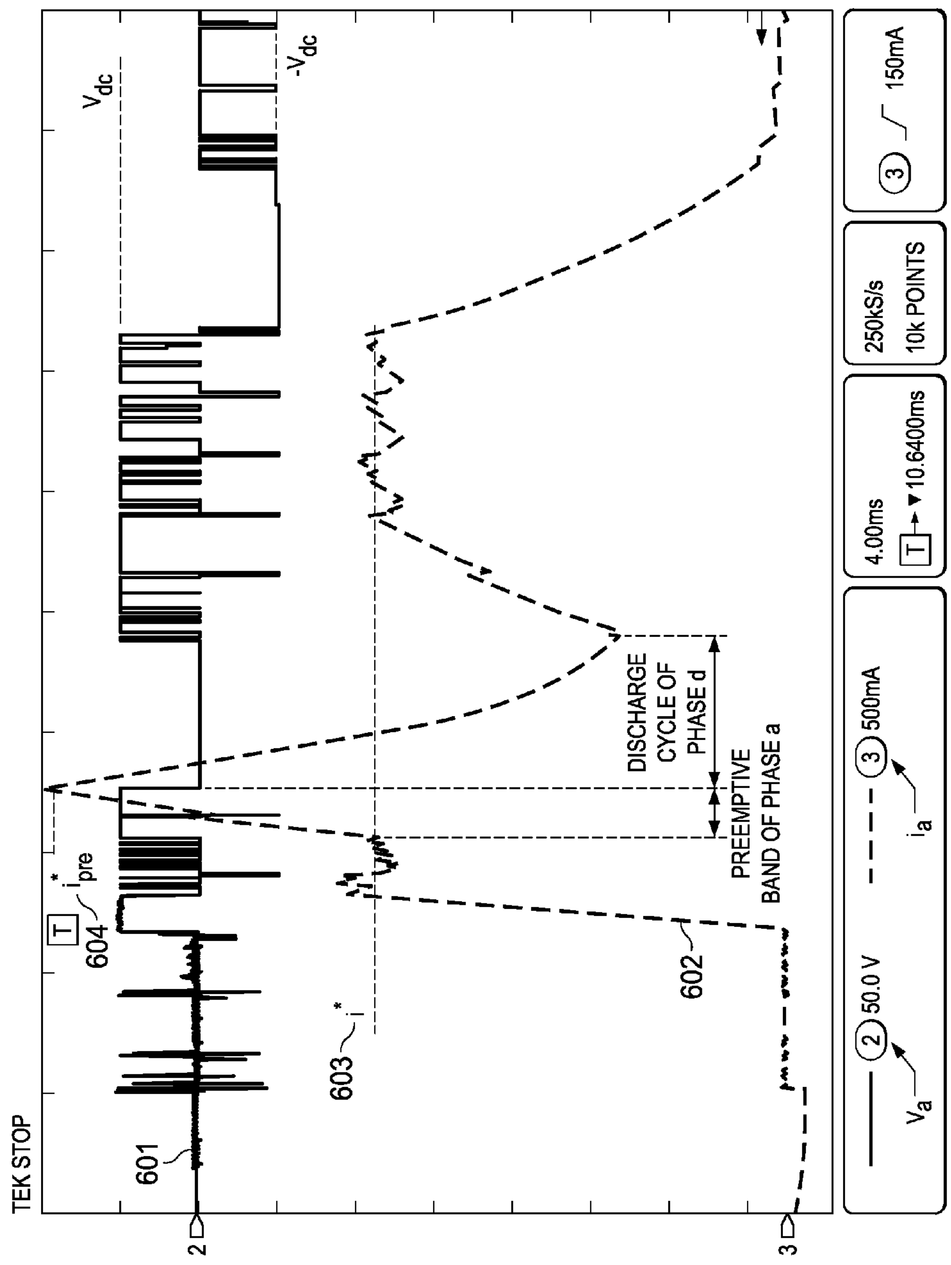
FIG. 6 is a graph of measured voltage and current waveforms of a phase of a switched reluctance machine of a preferred embodiment.

Referring to FIG. 6, measured voltage waveform 601 and measured current waveform 602 of phase a of switched reluctance machine 206 are shown. Reference current 603 is increased to preemptive reference current 604 during the preemptive band of phase a prior to the discharge period of the previous phase, phase d. Reference current 603 was set at 2.5 A. Preemptive reference current 604 was set at 4.75 A. Soft chopping was performed on phase a during the discharge period of phase d.

Figure 7:
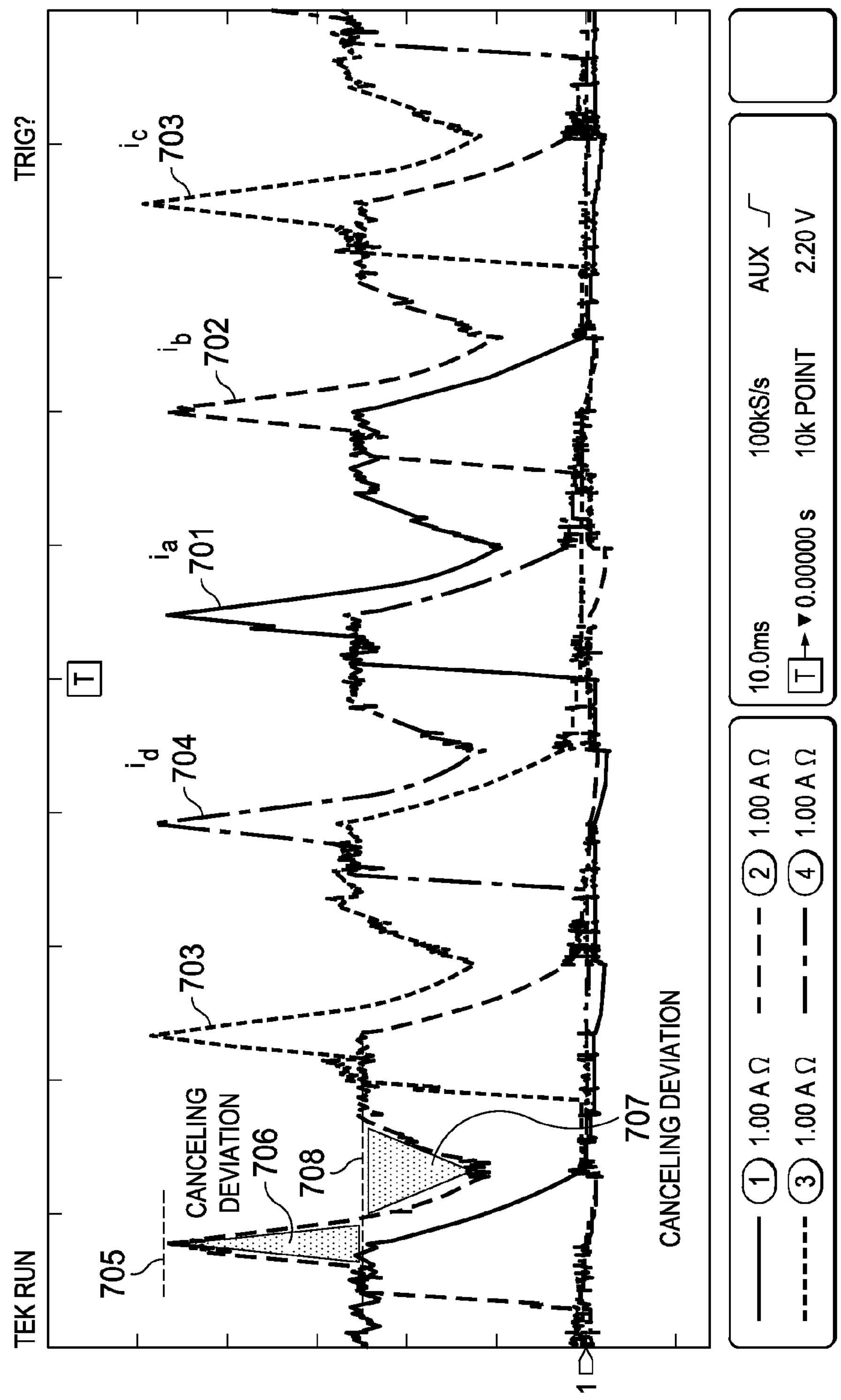
FIG. 7 is a graph of measured current waveforms for multiple phases of a switched reluctance machine of a preferred embodiment.

Referring to FIG. 7, the measured current waveforms of each phase of switched reluctance machine 206 are shown synchronized with the measured signals in FIG. 6 controlling switched reluctance machine 206 during motoring control process 400. Current waveform 701 is the measured current in phase a. Current waveform 702 is the measured current in phase b. Current waveform 703 is the measured current in phase c. Current waveform 704 is the measured current in phase d. Preemptive reference current 705 was calculated using Eq. 19.

For example, using preemptive reference current 705, the overall average current during preemptive band 706 and freewheeling period 707 of phase b is equal to reference current 708. The average current during preemptive band 706 and freewheeling period 707 of phase b is the total area under current waveform 703.

Test 2

Figure 8:
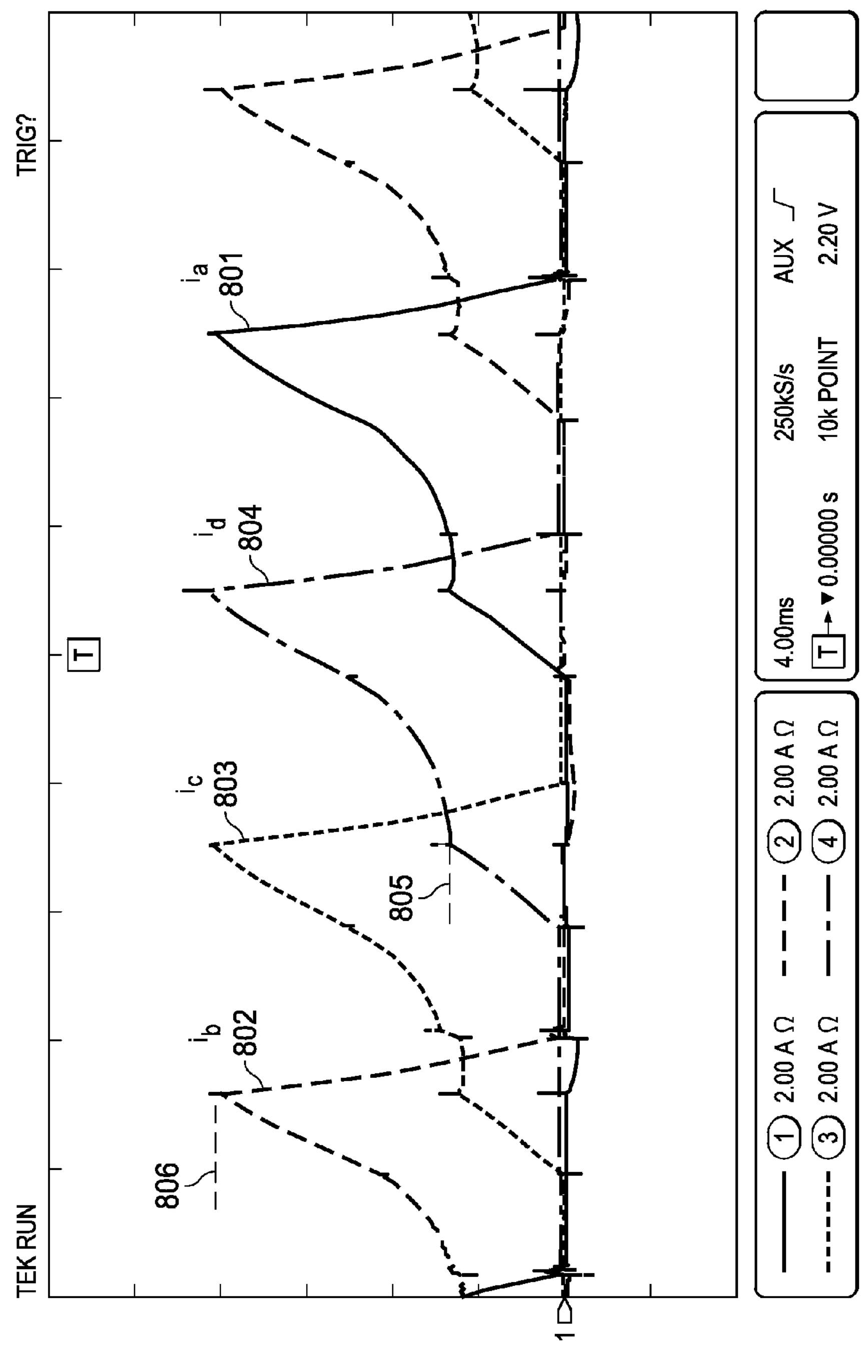
FIG. 8 is a graph of measured current waveforms for multiple phases of a switched reluctance machine during a single pulse generation mode of the prior art.

Referring to FIG. 8, the measured current waveforms during a single pulse generation process of the prior art are shown. Current waveform 801 is the measured current in phase a. Current waveform 802 is the measured current in phase b. Current waveform 803 is the measured current in phase c. Current waveform 804 is the measured current in phase d. During the single pulse generation process of the prior art, the phases are magnetized first, then the current is discharged from the phases. Single pulse generation of the prior art can include a freewheeling cycle to allow the back EMF to increase the amplitude of the current. At the end of the conduction band of each phase, the current in each phase is discharged and the absorbed energy is transferred to the dc bus. Reference current 805 was 3 A. After each conduction band, current 806 was 8 A. This current stress from the single pulse generation process of the prior art can lead to failure of the diodes in inverter 204, thereby requiring higher rating for the diodes of inverter 204.

Test 3

In Test 3, generation process 500 was tested. In contrast to Test 2, the controlled and limited peak current amplitudes, the stress over inverter 204, and the current ratings of the diodes of inverter 204 were reduced.

Figure 9:
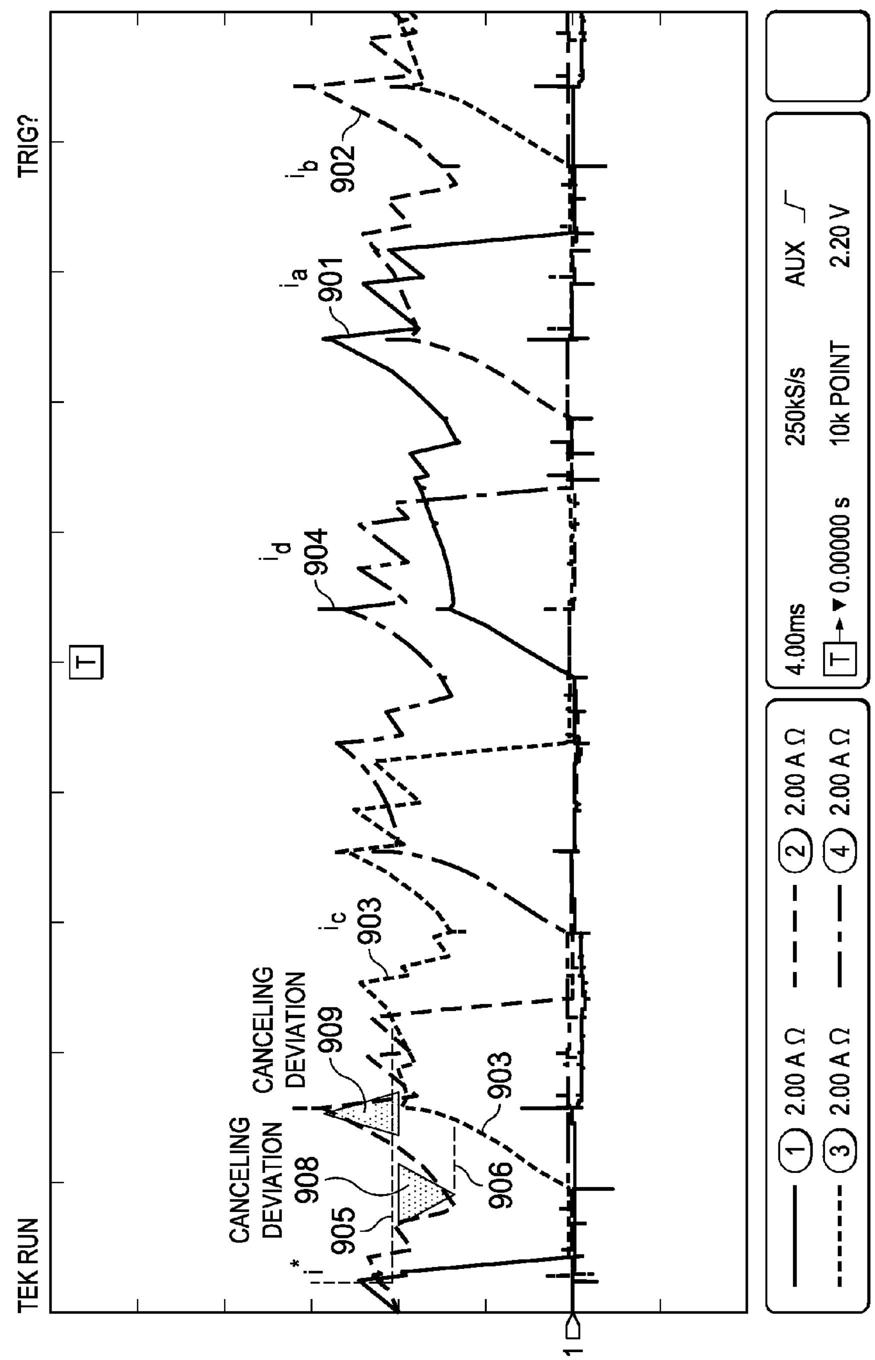
FIG. 9 is a graph of measured current waveforms for multiple phases of a switched reluctance machine of a preferred embodiment.

Referring to FIG. 9, the measured current waveforms during generation process 500 are shown. Current waveform 901 is the measured current in phase a. Current waveform 902 is the measured current in phase b. Current waveform 903 is the measured current in phase c. Current waveform 904 is the measured current in phase d. Reference current 905 was 4 A. The maximum current was limited to 5 A. When the current reaches the maximum current in each phase, hard chopping is performed using generation process 500 to absorb the energy from each phase, thereby restricting the current to the boundaries of hysteresis control 209. In order to reduce the peak current during the charging process of the next phase, preemptive reference current 906 is used. Preemptive reference current 906 is less than reference current 905. Prior to the start of the conduction band of the next phase, the current of each active phase is reduced to preemptive reference current 906. Using generation process 500, during the freewheeling period of the phase, the current will not exceed the boundaries of hysteresis control 209. For example, in phase b, preemptive band 908 reduces the current from reference current 905 to preemptive reference current 906 before increasing to the maximum current during freewheeling period 909.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A method for controlling a switched reluctance machine comprising the steps of:

determining a conduction band for an electrical phase angle for each phase of a set of phases;

enforcing a reference current in each phase of the set of phases;

determining a preemptive band for the electrical phase angle for each phase of the set of phases;

increasing the reference current to a preemptive reference current in each phase of the set of phases;

discharging the reference current from each phase of the set of phases;

wherein the preemptive reference current ($i_{pre}$*) is in accordance with:

$$i^*_{pre} = \frac{2i^*}{1 + e^{\frac{L'_{kk_\theta}\omega + R_k}{L_{kk}} t_{discharge}}};$$

wherein a time to discharge the current ($y_{discharge}$) is in accordance with:

$$t_{discharge} = \frac{-L_{jj}}{L'_{jj_\theta}\omega + R_j} \ln\left(\frac{v_{dc}}{v_{dc} + i^*(L'_{jj_\theta}\omega + R_j)}\right);$$

and, wherein currents of the switched reluctance machine during the time to discharge are in accordance with:

$$i_k(t) - i^*_{pre} e^{-\frac{L'_{kk_\theta}\omega + R_k}{L_{kk}} t};$$

$$i_j(t) i^* e^{\frac{L'_{jj_\theta}\omega + R_j}{L_{jj}} t} + \frac{-v_{dc}}{L'_{jj_\theta}\omega + R_j}\left(1 - e^{-\frac{L'_{jj_\theta}\omega + R_j}{L_{jj}} t}\right).$$

2. The method of claim 1, wherein the step of determining a conduction band for the electrical phase angle for each phase of the set of phases further comprises the steps of:

determining a starting angle of the conduction band; and determining an ending angle of the conduction band.

3. The method of claim 2, wherein the steps of enforcing a reference current in each phase of the set of phases, determining a preemptive band for the electrical phase angle for each phase of the set of phases, and increasing the reference current to a preemptive reference current in each phase of the set of phases, are performed when the electrical phase angle is greater than the starting angle and less than the ending angle.

4. The method of claim 2, wherein the step of discharging the reference current from each phase of the set of phases is performed when the electrical phase angle is greater than the ending angle.

5. The method of claim 1, wherein the step enforcing a reference current in each phase of the set of phases further comprises the step of applying a hysteresis control to enforce the reference current in each phase of the set of phases.

6. The method of claim 1, wherein the steps of determining a preemptive band for the electrical phase angle for each phase of the set of phases further comprises the steps of:

determining a starting preemptive angle; and determining an ending preemptive angle.

7. The method of claim 6, wherein the step of increasing the reference current to a preemptive reference current in each phase of the set of phases is performed when the electrical phase angle is greater than the starting preemptive angle and less than the ending preemptive angle.

8. The method of claim 6, further comprising the step of turning off a current in a phase i−1 when the electrical phase angle is greater than the starting preemptive angle and less than the ending preemptive angle.

9. A method for controlling a switched reluctance machine comprising the steps of:

determining a conduction band for an electrical phase angle for each phase of a set of phases;

increasing a first current in each phase of the set of phases;

determining a reference current for the first current in each phase of the set of phases;

enforcing the reference current on each phase of the set of phases;

determining a preemptive band for the electrical phase angle for each phase of the set of phases;

reducing the reference current to a preemptive current in each phase of the set of phases; and discharging the reference current from each phase of the set of phases;

wherein the preemptive current ($_{pre}$*) is in accordance with:

$$i^*_{pre} = \frac{2i^*}{1 + e^{\frac{L'_{kk_\theta}\omega + R_k}{L_{kk}} t_{discharge}}};$$

wherein a time to discharge the current ($t_{discharge}$) is in accordance with:

$$t_{discharge} = \frac{-L_{jj}}{L'_{jj_\theta}\omega + R_j}\ln\left(\frac{v_{dc}}{v_{dc} + i^*(L'_{jj_\theta}\omega + R_j)}\right);$$

and, wherein currents of the switched reluctance machine during the time to discharge are in accordance with:

$$i_k(t) - i^*_{pre} e^{-\frac{L'_{kk_\theta}\omega + R_k}{L_{kk}} t};$$

$$i_j(t) i^* e^{\frac{L'_{jj_\theta}\omega + R_j}{L_{jj}} t} + \frac{-v_{dc}}{L'_{jj_\theta}\omega + R_j}\left(1 - e^{-\frac{L'_{jj_\theta}\omega + R_j}{L_{jj}} t}\right).$$

10. The method of claim 9, wherein the step of enforcing the reference current on each phase of the set of phases further comprises the steps of applying a hysteresis control to enforce the reference current in each phase of the set of phases.

11. The method of claim 9, wherein the step of determining a conduction band for the electrical phase angle for each phase of the set of phases further comprises the steps of:

determining a starting angle of the conduction band; and determining an ending angle of the conduction band.

12. The method of claim 11, wherein the steps of increasing a current in each phase of the set of phases, determining a reference current for the current for each phase of the set of phases, enforcing the reference current on each phase of the set of phases, determining a preemptive band for the electrical phase angle for each phase of the set of phases, and reducing the reference current to a preemptive current in each phase of the set of phases, are performed when the electrical phase angle is greater than the starting angle and less than the ending angle.

13. The method of claim 11, wherein the step of discharging the reference current from each phase of the set of phases is performed when the electrical phase angle is greater than the ending angle.

14. The method of claim 9, wherein the step of determining a preemptive band for the electrical phase angle for each phase of the set of phases further comprises the steps of:

determining a starting preemptive angle; and determining an ending preemptive angle.

15. The method of claim 14, wherein the step of decreasing the reference current to a preemptive reference current in each phase of the set of phases is performed when the electrical phase angle is greater than the starting preemptive angle and less than the ending preemptive angle.

16. The method of claim 14, further comprising the step of charging a phase i+1with a second current when the electrical phase angle is greater than the starting preemptive angle and less than the ending preemptive angle.

17. A system for operating a switched reluctance machine comprises:

a controller;

an inverter connected to the controller and to the switched reluctance machine;

a hysteresis control connected to the controller and to the inverter;

a set of sensors connected to the switched reluctance machine and to the controller;

the switched reluctance machine further comprising a set of phases;

the controller further comprising a processor and a memory connected to the processor;

wherein the processor is programmed to carry out the steps of:

determining a conduction band for an electrical phase angle for each phase of the set of phases;

enforcing a reference current in each phase of the set of phases;

determining a preemptive band for the electrical phase angle for each phase of the set of phases;

increasing the reference current to a preemptive reference current in each phase of the set of phases;

discharging the reference current from each phase of the set of phases;

wherein the preemptive reference current ($i_{pre}$*) is in accordance with:

$$i_{pre}^{*}=\frac{2i^{*}}{1+e^{\frac{L'_{kk_{\theta}}\omega+R_{k}}{L_{kk}}t_{discharge}}};$$

wherein a time to discharge the current ($t_{discharge}$ ) is in accordance with:

$$t_{discharge}=\frac{-L_{jj}}{L'_{jj_{\theta}}\omega+R_{j}}\ln\left(\frac{v_{dc}}{v_{dc}+i^{*}(L'_{jj_{\theta}}\omega+R_{j})}\right);$$

and, wherein currents of the switched reluctance machine during the time to discharge are in accordance with:

$$i_{k}(t)-i_{pre}^{*}e^{-\frac{L'_{kk_{\theta}}\omega+R_{k}}{L_{kk}}t};$$

$$i_{j}(t)i^{*}e^{\frac{L'_{jj_{\theta}}\omega+R_{j}}{L_{jj}}t}+\frac{-v_{dc}}{L'_{jj_{\theta}}\omega+R_{j}}\left(1-e^{-\frac{L'_{jj_{\theta}}\omega+R_{j}}{L_{jj}}t}\right).$$

18. The system of claim 17, wherein the processor is further programmed to carry out the step of:

turning off a current in a phase i−1 during the preemptive band.

19. A system for operating a switched reluctance machine comprises:

a controller;

an inverter connected to the controller and to the switched reluctance machine;

a hysteresis control connected to the controller and to the inverter;

a set of sensors connected to the switched reluctance machine and to the controller;

the switched reluctance machine further comprising a set of phases;

the controller further comprising a processor and a memory connected to the processor;

wherein the processor is programmed to carry out the steps of:

determining a conduction band for an electrical phase angle for each phase of the set of phases;

increasing a first current in each phase of the set of phases;

determining a reference current for the first current in each phase of the set of phases;

enforcing the reference current on each phase of the set of phases;

determining a preemptive band for the electrical phase angle for each phase of the set of phases;

reducing the reference current to a preemptive reference current in each phase of the set of phases;

discharging the reference current from each phase of the set of phases;

wherein the preemptive reference current ($i_{pre}$*) is in accordance with:

$$i_{pre}^{*}=\frac{2i^{*}}{1+e^{\frac{L'_{kk_{\theta}}\omega+R_{k}}{L_{kk}}t_{discharge}}};$$

wherein a time to discharge the current ($t_{discharge}$) is in accordance with:

$$t_{discharge}=\frac{-L_{jj}}{L'_{jj_{\theta}}\omega+R_{j}}\ln\left(\frac{v_{dc}}{v_{dc}+i^{*}(L'_{jj_{\theta}}\omega+R_{j})}\right);$$

and, wherein currents of the switched reluctance machine during the time to discharge are in accordance with:

$$i_{k}(t)-i_{pre}^{*}e^{-\frac{L'_{kk_{\theta}}\omega+R_{k}}{L_{kk}}t};$$

$$i_{j}(t)i^{*}e^{\frac{L'_{jj_{\theta}}\omega+R_{j}}{L_{jj}}t}+\frac{-v_{dc}}{L'_{jj_{\theta}}\omega+R_{j}}\left(1-e^{-\frac{L'_{jj_{\theta}}\omega+R_{j}}{L_{jj}}t}\right).$$

20. The system of claim 19, wherein the processor further programmed to carry out the step of:

charging a phase i+1 with a second current during the preemptive band.

* * * * *